April 5, 1955 G. LESSMAN 2,705,437
MAGAZINE TYPE SLIDE PROJECTOR
Filed July 1, 1952 10 Sheets-Sheet 2

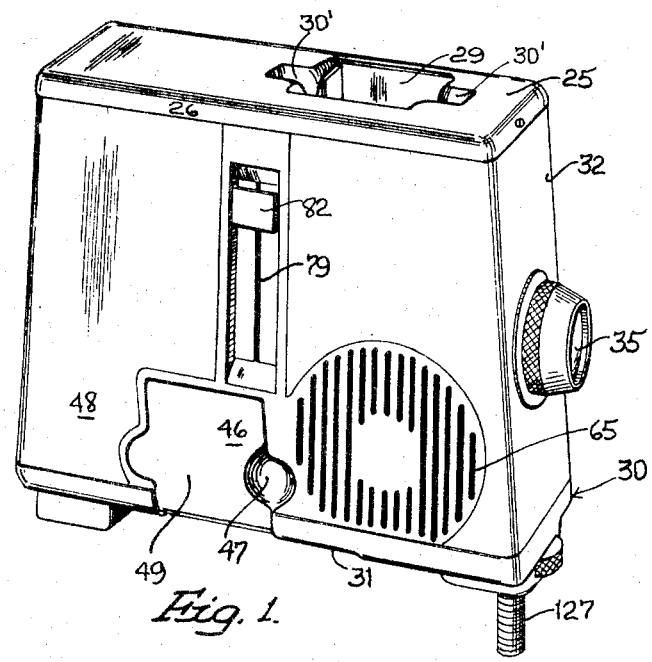
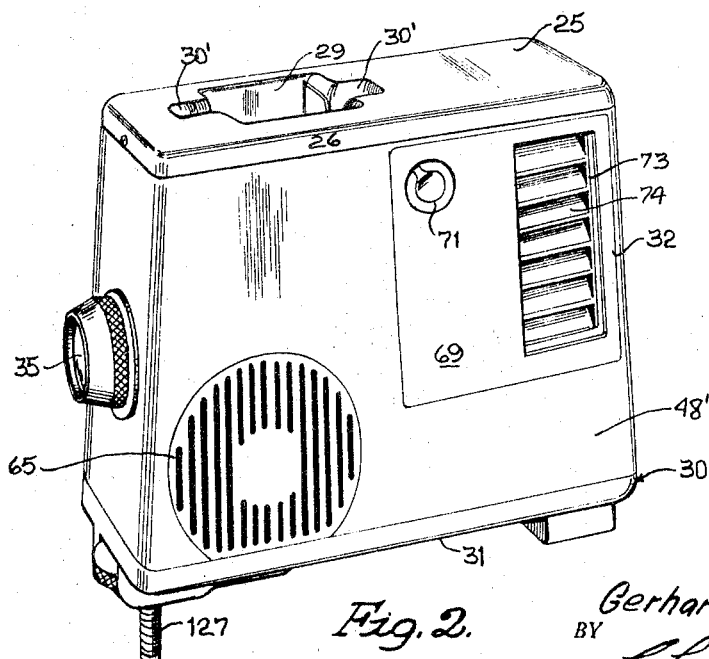

INVENTOR.
Gerhard Lessman
BY
Clarence E. Threedy
HIS ATTORNEY.

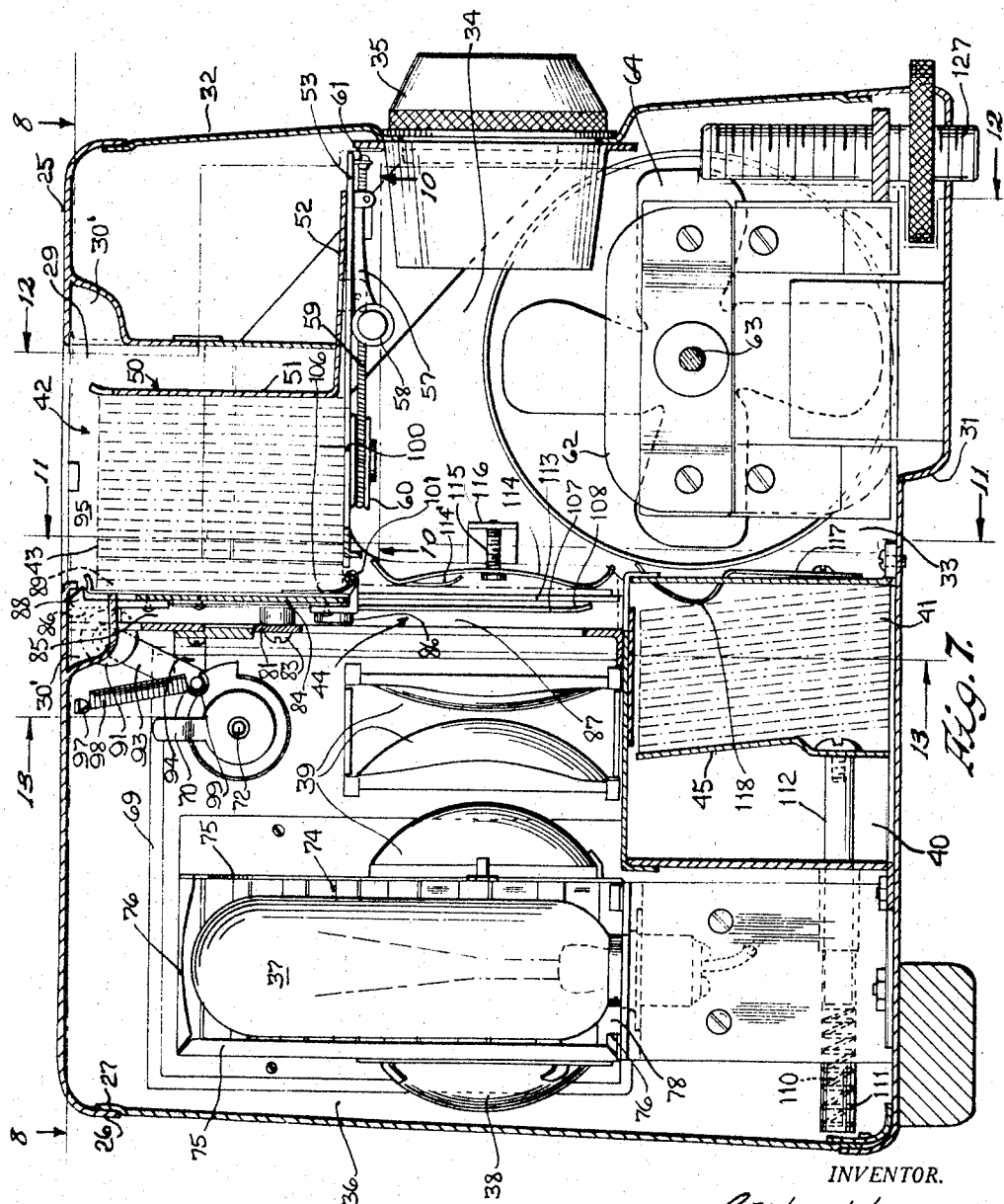

April 5, 1955 G. LESSMAN 2,705,437
MAGAZINE TYPE SLIDE PROJECTOR
Filed July 1, 1952 10 Sheets-Sheet 6
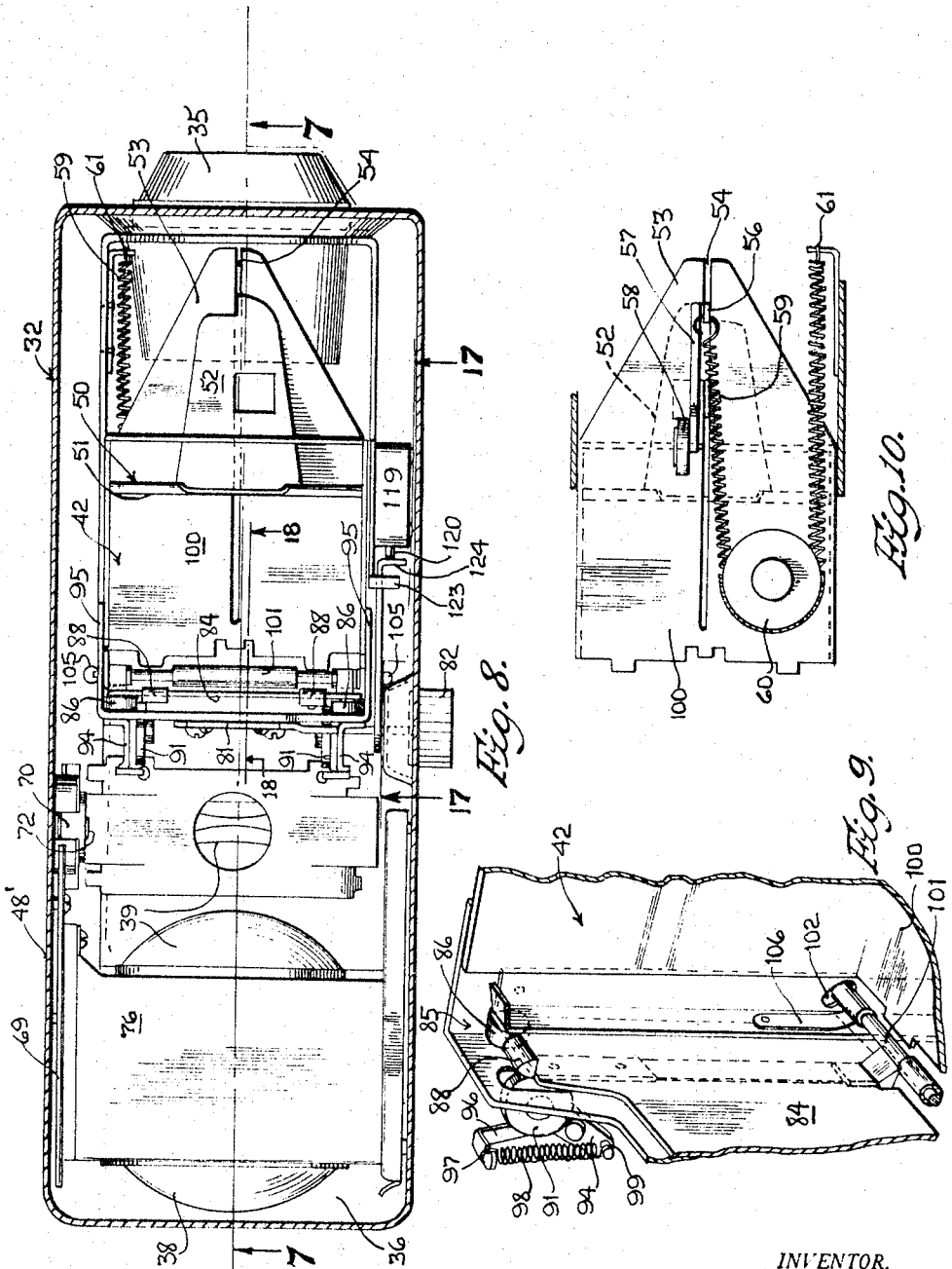
INVENTOR.
Gerhard Lessman
BY Clarence E. Kready
HIS ATTORNEY.

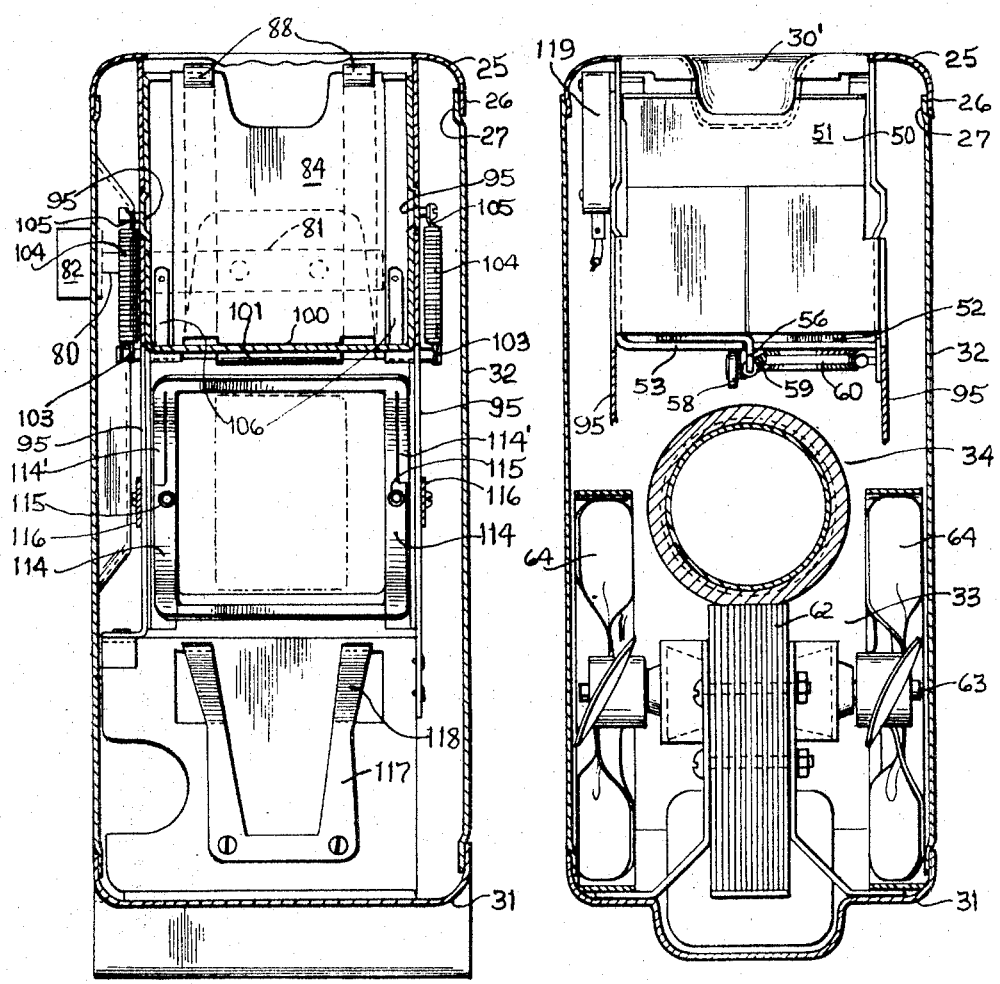

April 5, 1955
G. LESSMAN
2,705,437
MAGAZINE TYPE SLIDE PROJECTOR
Filed July 1, 1952
10 Sheets-Sheet 8
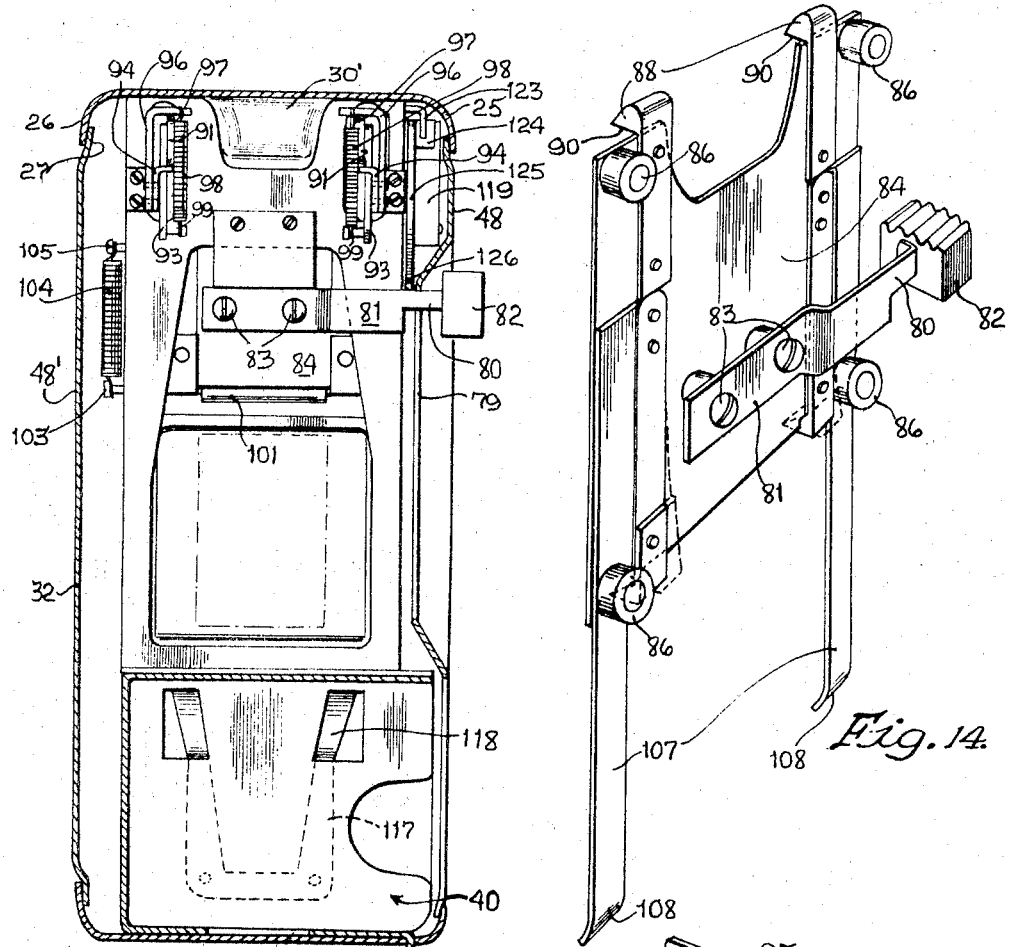
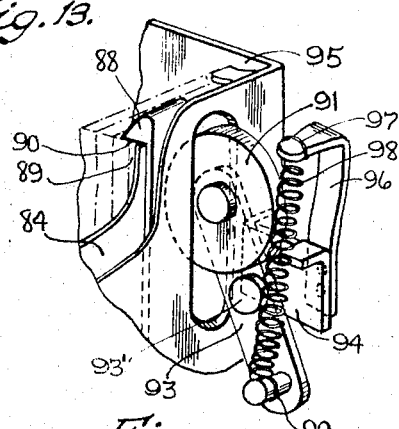
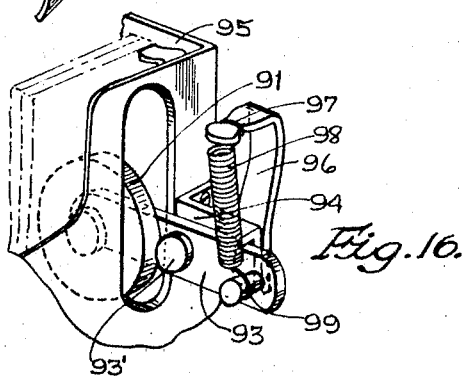
INVENTOR.
Gerhard Lessman
BY Clarence E. Shrudy
HIS ATTORNEY.

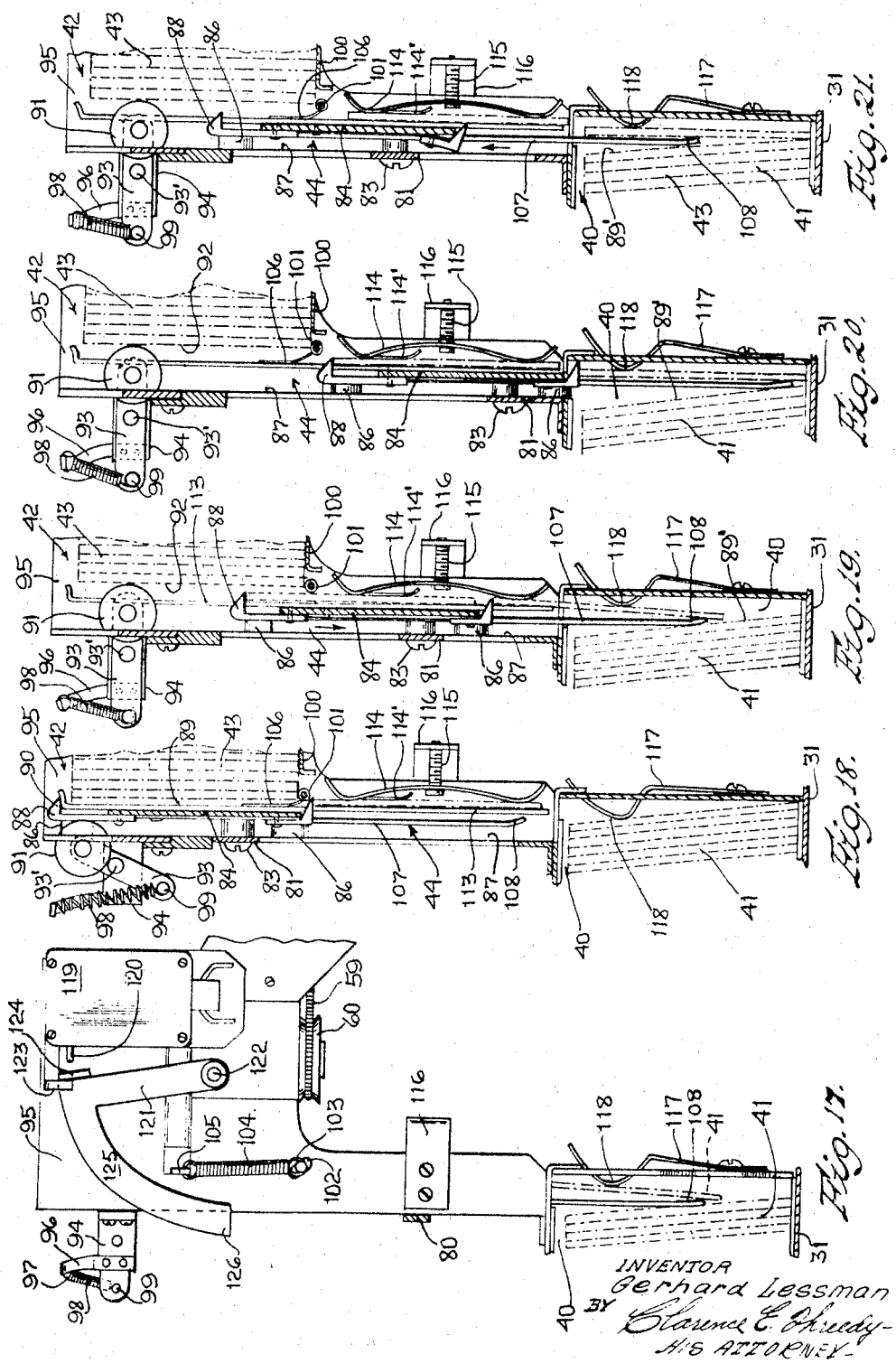

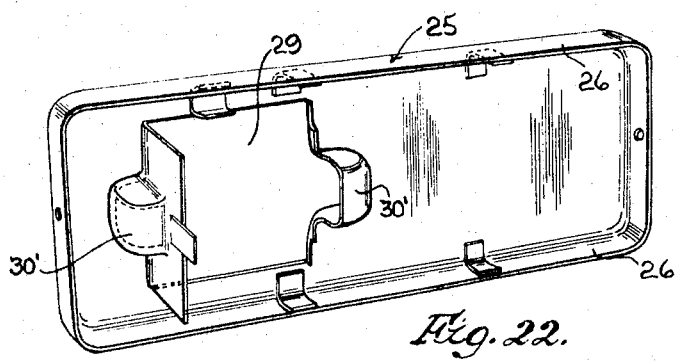
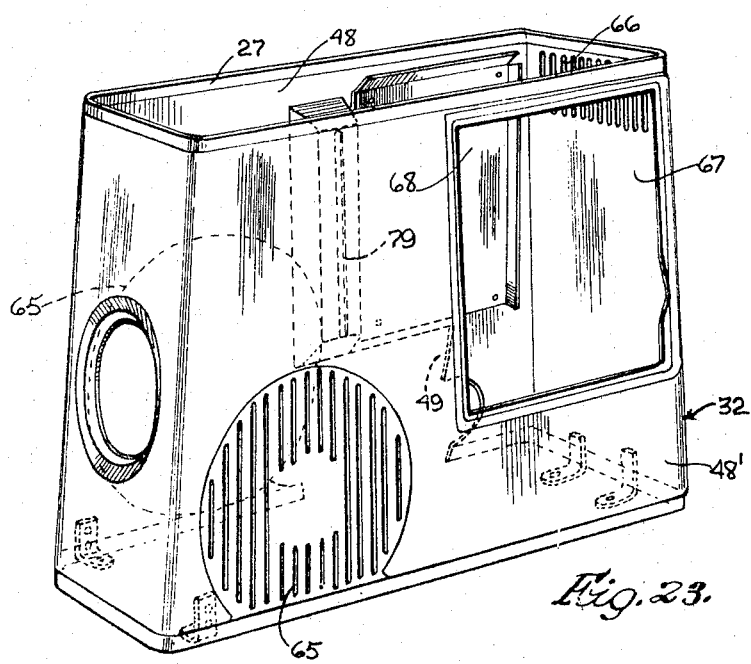

United States Patent Office 2,705,437
Patented Apr. 5, 1955

2,705,437

MAGAZINE TYPE SLIDE PROJECTOR

Gerhard Lessman, Chicago, Ill., assignor to De Vry Corporation, Chicago, Ill., a corporation of Illinois Application July 1, 1952, Serial No. 296,688

9 Claims. (Cl. 88—28)

This invention relates to novel improvements in magazine type slide projectors. One of the many objects of the invention is to provide such a device in which the slides are moved mechanically by manual operation from a storage compartment through a slide channel into another storage compartment.

Another and equally important object of the invention is to provide a slide projector in which the movement of the slide is accomplished by manually actuated mechanism, without the necessity of any adjustments necessary to accommodate slides of various thicknesses.

Another object of the invention is to provide in a slide projector a cooling arrangement whereby the cool air is directed first into the area occupied by a slide during projection operation and then passes through a lamp compartment to the rear of the projected slide.

Another and important object of the invention is the novel and inexpensive manner of mounting the condenser lens and reflector lens, permitting the same to be bodily removed without disturbing or removing the lamp from the lamp housing.

Another and equally important object of the invention is the provision of a device of this character in which the slides will not hang upon one another by reason of projecting edges during the movement of the slides to projected position.

A still further and equally important object of the invention is the provision of controlling the energization of the lamp by the slide moving means and by mechanism completely under the control of the operator.

Other objects will appear hereinafter.

The invention consists in the novel combination and arrangement of parts to be hereinafter described and claimed.

The invention will be best understood by reference to the accompanying drawings showing the preferred form of construction, and in which:

Figs. 1 and 2 are perspective views of my improved slide projector;

Fig. 7 is a sectional detail view taken substantially on line 7—7 of Fig. 8;

Fig. 8 is a sectional detail view taken substantially on line 8—8 of Fig. 7;

Fig. 9 is a fragmentary perspective view of certain of the elements of the slide moving mechanism;

Fig. 10 is a fragmentary sectional detail view taken substantially on line 10—10 of Fig. 7;

Fig. 11 is a sectional detail view taken substantially on line 11—11 of Fig. 7;

Fig. 12 is a sectional detail view taken substantially on line 12—12 of Fig. 7;

Fig. 13 is a sectional detail view taken substantially on line 13—13 of Fig. 7;

Fig. 14 is a perspective view of the slide pull plate embodied in the invention;

Fig. 15 is a perspective view of a slide retaining mechanism embodied in the invention;

Fig. 16 is a perspective view similar to Fig. 15, but showing the parts in different positions;

Figure 3:
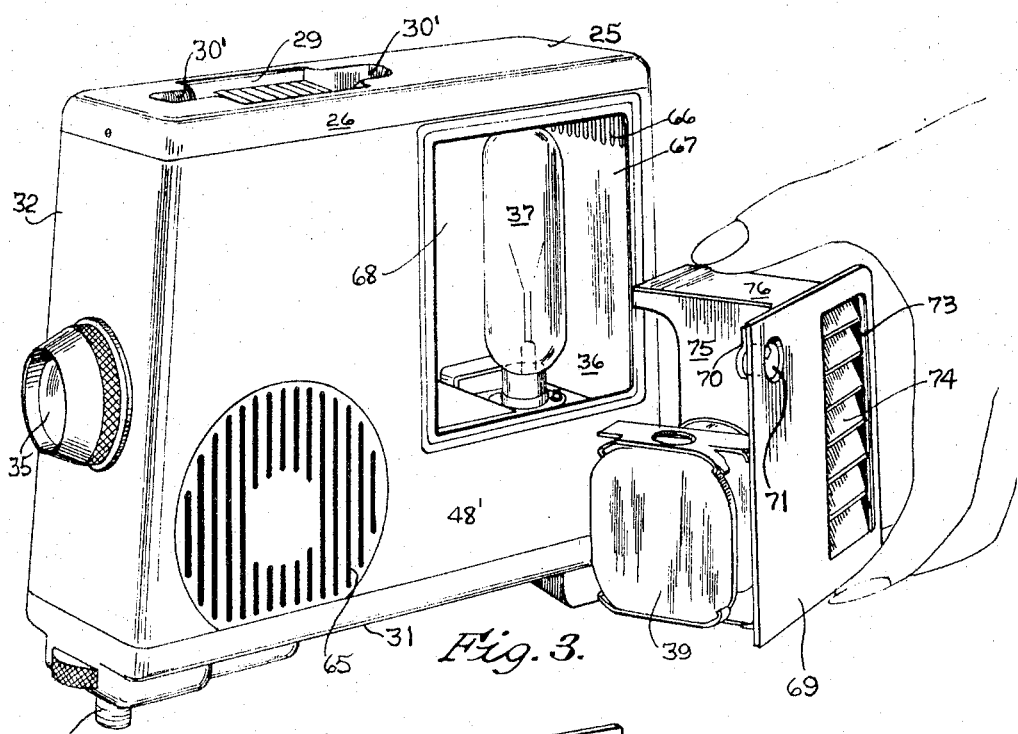
Fig. 3 is a perspective view similar to Fig. 2, but showing the condenser lens assembly removed from the lamp compartment.

Fig. 17 is a fragmentary side elevational view taken substantially on line 17—17 of Fig. 8 but with the actuating bar 81 in lowered position and the arm 121 disengaged from the switch actuating plunger 120;

Fig. 18 is a fragmentary sectional detail view taken substantially on line 18—18 of Fig. 8;

Figs. 19 to 21 inclusive are fragmentary sectional detail views similar to Fig. 18, but showing the parts in different positions;

Fig. 22 is a top plan view of the cover of the casing; and

Fig. 23 is a perspective view of the side and end walls of the casing.

The several objects of my invention are intended to be accomplished by, and for the best performance I prefer to construct, my slide projector in accordance with the following description which is of the preferred form of construction:

The slide projector embodying my invention includes an enclosure 30. This enclosure in the present form of construction includes a bottom wall 31 on which the several instrumentalities of my slide projector are mounted. On this bottom wall 31 is mounted the casing 32 of the enclosure. These parts may be secured together in any convenient and preferred manner.

The enclosure includes a top wall 25 having depending flanges 26 which embrace the peripheral edge 27 of the side and end walls of the casing 32. This top wall 25 has formed therein an opening 29 which communicates with the storage compartment 42 for the slides, hereinafter referred to. Adjacent the opposite corresponding edges of this opening 29, the casing provides finger grooves or wells 30' for reception of the fingers to facilitate mounting of a stack of slides in the compartment 42. The top wall or cover 25 may be attached to the side and end walls of the casing 32 by means of suitable screws or the like.

The casing 32 provides a fan housing 33 communicating with a lens compartment 34 within which a projector lens assembly 35 is mounted. This casing also provides a lamp housing 36 within which a suitable lamp 37 is mounted in any approved manner. Associated with this lamp 37 are reflecting lenses 38 in line with the projector lens assembly 35. Mounted in this lamp housing 36 in line with the lenses 38 and the lens assembly 35, is a condenser lens assembly 39.

To the rear of the fan housing 33 and arranged within the lamp housing 36 is a storage chamber 40 which receives the slides after they have been projected by the projector lens 35.

Within the casing 32 and above the lens compartment 34, is a storage compartment 42 within which the slides 43 to be viewed are assembled on edge in parallel relation with respect to each other.

Communicating with the storage chamber 40 and the storage compartment 42, is a slide channel 44 into which the slides 43 are successively received from the compartment 42, moved in line with the projecting lens 35, and thence moved, after being viewed, into the chamber or compartment 40, by mechanism to be presently described.

Arranged in the storage compartment 40 into which the viewed slides 41 are received, is a pusher plate 45, the upper end of which is inclined upwardly and rearwardly, as shown in Fig. 7. This pusher plate 45 is formed as an integral part of a wall 46 and extends substantially at right angles with respect to the wall 46. Suitable guiding ribs are provided for this wall 46. At the junction between the pusher plate 45 and wall 46 there is provided an indentation 47 of sufficient size and depth to receive the tip of the thumb or a finger, to facilitate manually moving the pusher plate 45 away from the slides 41.

In the side wall 48 of the casing 32 (Fig. 1), is an opening 49 which communicates with the compartment 40 and through which the viewed slides 41 may be removed. In the storage compartment 42 is a pusher plate 50 having a vertically extending section 51 adapted to engage the stack of slides 43, to yieldably urge such slides successively to a position for movement through the slide channel 44. This plate 50 includes a substantially horizontal portion 52 which is slidably positioned upon a partition 53 having a long slot 54 (Figs. 5, 7, 10) through which a depending lip 56 (Fig. 7) formed as an integral part of the plate portion 52, projects. Connected to this lip 56 is a link 57 having mounted on its inner end portion a roller 58 which engages the under surface of the partition 53, the roller serving to reduce the degree of friction during the sliding movement of the pusher plate 50. This lip 56 has connected thereto one end portion of a spring 59 which passes over a grooved roller 60 (Fig. 7), with its opposite end portion connected as at 61 to the partition 53. This spring 59 serves to yieldably retain pressure of the pusher plate 50 against the stack of slides 43 and is of sufficient tension to effect movement of the stack of slides in the direction of the guiding channel 44, as the slides are successively moved from the compartment 42.

In the fan housing 33 is arranged a motor 62 on the shaft 63, at each opposite end of which is mounted a fan 64. The opposite side walls 48 and 48' of the casing 32 are provided with grilles 65 through which cool air is drawn by the fans 64 into the housing 33. This air is forced by the fans 64 through the lens compartment 34 and thence over and around the lamp 37, to be expelled through a grille 66 (Fig. 23) formed in the rear wall 67 of the casing 32.

It is significant to note that the cool air first passes through the area through which the slides are positioned for projection, before it is forced over and around the lamp 37. By this arrangement, hot air does not come into contact with the stationary slide when in position for viewing, as would be the case where the air is first directed over and around or through the lamp housing. By such arrangement, the life of the slides is greatly prolonged and prevented from deteriorating by hot air.

Figure 4:
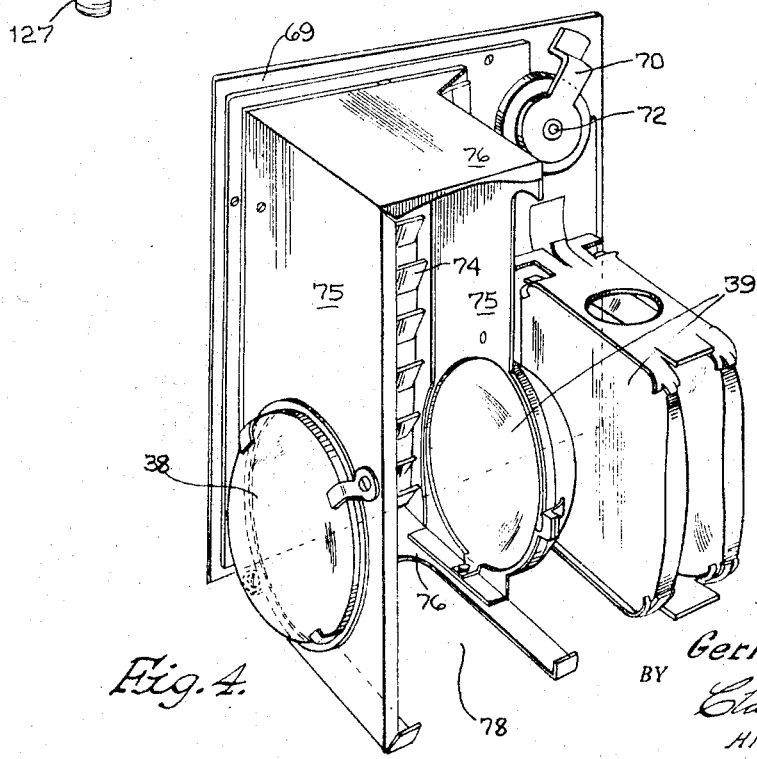
Fig. 4 is a perspective view of the condenser lens assembly and lamp reflector.

In the wall 48' of the casing 32 is an opening 68 (Fig. 3). This opening 68 is closed by a door 69 which, when mounted in closed position, is latched to the casing 32 by a suitable latch 70 operable from the exterior of the casing by means of a finger ring 71 secured to the shaft 72 on which the latch arm 70 is mounted. In this door 69 is an opening 73 closed by suitable louvers 74 which are arranged substantially opposite the lamp 37 (Fig. 3). This door carries (as shown in Fig. 4) the reflector lens 38 and the condenser lens assembly 39. The arrangement is such that the reflector lens and condenser lens assembly may be removed bodily from within the casing 32 upon removal of the door 69 so as to afford access to the lamp 37. The door 69 carries opposite wall portions 75 which embrace the lamp 37 (Fig. 7) when the door 69 is mounted in closed position. These walls 75 are connected together by top and bottom walls 76, the bottom wall 76 being slotted as at 78 to provide a clearance for the base of the lamp 37 to permit the door 69 to be mounted in the opening 68.

In the side wall 48 of the casing 32 (Fig. 1) is a vertically extending slot 79. Projecting outwardly through this slot 79 is the end portion 80 of an actuating bar 81. On this end portion 80 is preferably mounted a suitable finger button 82 (Fig. 14) which facilitates manual operation of the bar 81. This bar 81 is connected as at 83 to a pull plate 84 slidably arranged in opposed vertical grooves 85 of the slide channel 44. Suitable anti-friction rollers 86 are carried by the pull plate 84 and engage the wall 87 of the grooves 85 whereby to reduce frictional engagement between the pull plate 84 and the grooves 85.

Figure 5:
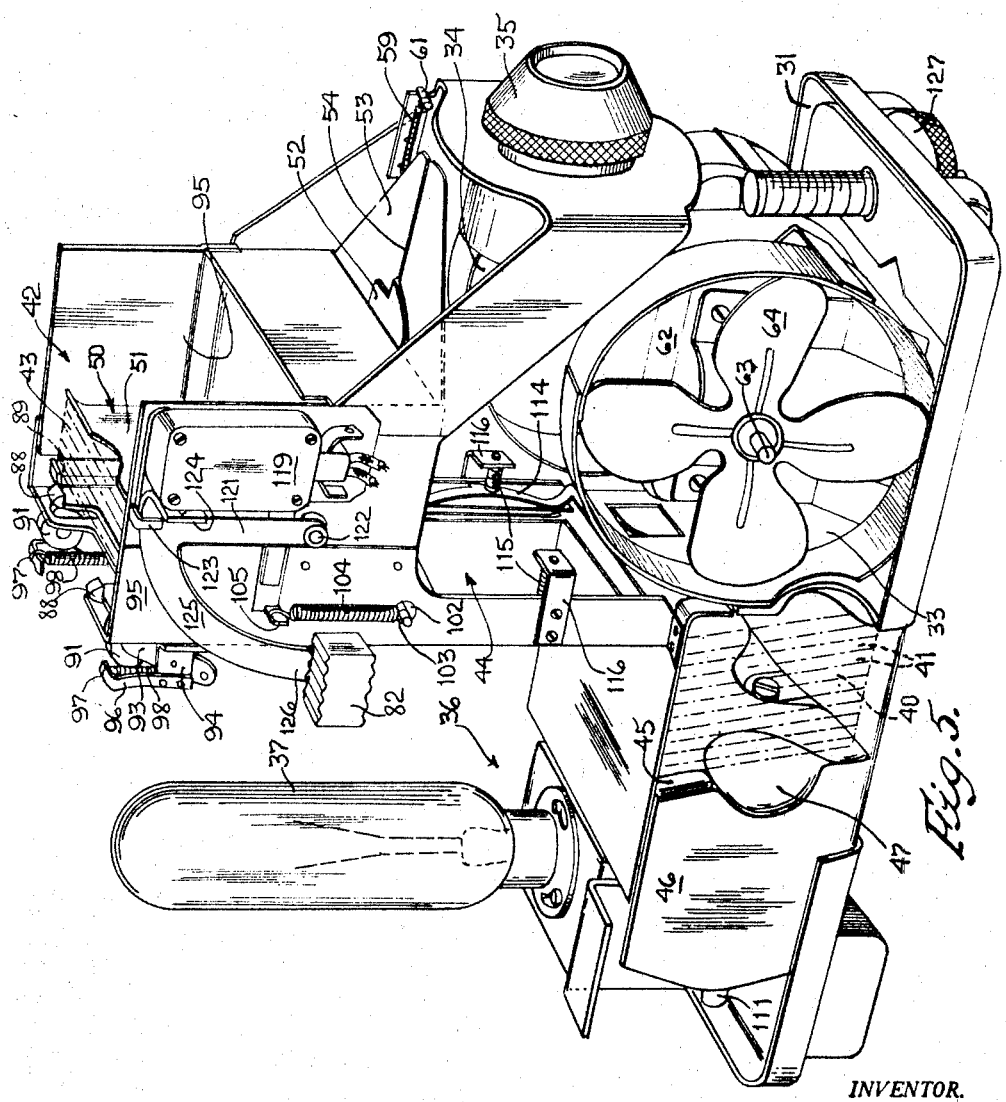
Fig. 5 is a perspective view of the slide projector removed from its enclosure, with the condenser lens assembly removed from the lamp compartment.
Figure 6:
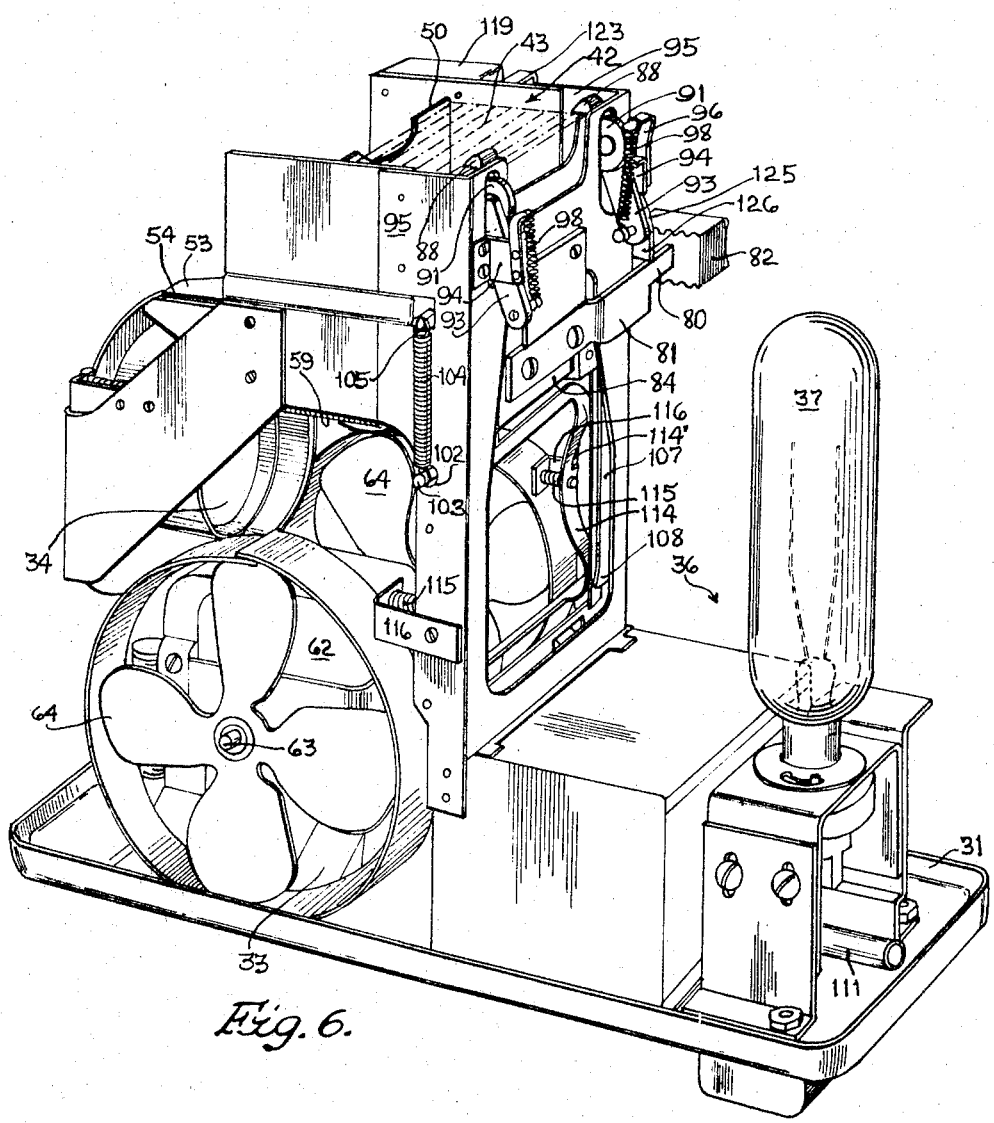
Fig. 6 is a perspective view similar to Fig. 5, viewed from the opposite side.

The upper end portion of the pull plate 84 provides slide-engaging fingers 88 (Fig. 14) which project inwardly in the direction of the storage compartment 42 and are adapted to engage the top edge of the adjacent slide 89 of the slides 43 to be moved through the slide channel 44. Downward movement of the pull plate 84 in the slide channel 44 will bring the flat slide-engaging edges 90 of the fingers 88 against the top edge of the slide 89 and move such slide downwardly in the slide channel 44. After a predetermined movement of this pull plate 84 from its uppermost position, the remaining slides 43 are yieldably held in the storage compartment 42 against the action of the pusher plate 50, in stacked formation as shown in Fig. 19, by a pair of rollers 91, which rollers are yieldably moved into bearing engagement with the adjacent slide 92. These rollers are mounted on links 93. These links 93 are pivotally connected as at 93' to brackets 94 secured to side plates 95 which form the side walls of the storage compartment 42 (Fig. 5). These brackets 94 have upwardly extending portions 96 to which corresponding ends 97 of springs 98 are connected. The opposite end portions of these springs are connected as at 99 to the outer end portions of the links 93. These springs 98 act to urge the rollers 91 against the outermost slide 92 of the stack of slides 43 to resist the movement of the stack of slides by the pressure plate 50.

Extending transversely of the storage compartment 42 adjacent and slightly below the bottom wall 100 thereof (Figs. 18–21) is an elongated rod 101 substantially cylindrical in cross section and functioning as a gate to allow movement of only one slide at a time. The ends of this gate project through diagonal slots 102 and are connected to corresponding end portions 103 of springs 104, the opposite corresponding end portions of such springs being connected to lateral lugs 105 struck from the side walls of the storage compartment 42 (Fig. 5).

The relationship of this gate 101 with respect to the stack of slides 43 is such that the slide indicated at 92 of the stack of slides 43 will have its lower edge portion disposed upon this gate 101 so that when the pull plate 84 is moved downwardly to transfer the slide 89 to the compartment 34, the slide 92 will be restrained by the gate 101 from moving down with the slide 92. By this arrangement the movement of more than one slide to the compartment 34 is prevented.

The relationship of the rollers 91 with respect to the stack of slides 43 in the compartment 42 is such that the slide 92 is yieldably held slightly away from the slide 89, thus preventing the edges of the frame of the slide 92 from clinging to the edges of the slide 89 or otherwise obstructing movement of the slide 89 to a position within the compartment 34. As the slide 89 is moved downwardly, a pair of leaf springs 106 bowed inwardly at their lower end portions in the direction of the gate 101 will engage the adjacent surface of the slide and function to prevent retraction of the slide upwardly when the pull plate 84 makes its return stroke. As the gate 101 is suspended by the springs 104, it is free to move yieldably downwardly away from the slide to compensate for variation in the thickness of the slides.

The pull plate 84 has a pair of oppositely disposed parallelly extending arms 107, the lower ends of which are curved as at 108 as shown in Figs. 18 to 21, and are adapted to engage the outermost slide 89' of the stack of slides 41 in the compartment 40. As these curved fingers engage the stack of slides, the stack is held in stack formation against the pusher plate 45 movable against the action of a spring 110 arranged in a sleeve 111, into which sleeve is slidably mounted for movement against the action of the spring 110, a stud shaft 112 connected to the pusher plate 45.

The slide 89, when positioned in the projecting compartment 34, is yieldably held against the adjacent side flanges 113 of the grooves 85 of the slide channel 44 by means of bowed springs 114 yieldably connected as at 115 to supporting brackets 116 carried by the side plates 95. These bowed springs 114 are each provided with spring fingers 114' (Fig. 11) which, when in engagement with the upper end portion of the slide as it is moved from projecting position downwardly to the storage compartment, prevent the slide from flopping out of its path of movement.

The slides are maintained in stacked position in the compartment 40 by means of a spring 117 having a bowed end portion 118 which bears against the outermost slide of the stack of slides 41. By means of this spring the stack 41 is maintained in stacked formation against the pusher plate 45.

To move a slide from the storage compartment 42 to the projecting compartment 34 and from thence to the storage compartment 40, the operator firmly grasps the finger knob 82 to move the pull plate 84 downwardly to bear the fingers 88 against the top edge of the slide adjacent to the pull plate 84. Downward movement of the pull plate will move the slide to the projecting compartment 34, in which compartment the slide will be held by the action of the springs 114 thereagainst. The pull plate 84 is returned to its normal position where the fingers 88 will again engage the top edge of the next slide to be moved from the compartment 42. As this latter slide is moved by the pull plate 84 from this compartment, it bears against the slide retained in the projecting compartment 34, and as the former is moved downwardly by the pull plate, the latter slide is moved into the compartment 40 forwardly of the pusher plate 45, the bowed spring 117 acting to tilt the slide against the pusher plate 45.

As before stated, the gate 101 cooperates with the springs 106 to prevent two slides being moved at the same time. If the slide to be moved has a frame which is thicker than the standard requirement, such condition will not interfere with the movement of the slide because of the ability of the gate 101 to adjust itself to the thickness of the slide being moved. Thus, the gate 101 has the function of preventing two slides from being moved at the same time.

The lamp 37 is of a standard construction and is intended to be connected in a circuit with a control switch indicated at 119 (Figs. 5, 17). This control switch is of a standard construction, including a plunger 120 which actuates the switch elements (not shown) of the switch 119. It is desirable that the lamp 37 be energized only when a slide is in the projecting compartment 34. This is accomplished by an arrangement which will close the switch 119 only when the slide is in the projecting compartment 34. The mechanism for accomplishing this result comprises an arm 121 pivoted as at 122 to the adjacent side wall 95. A suitable guide 123 is provided by the side wall, and this guide also cooperates with a lug 124 for limiting the pivotal movement of the arm 121 away from the plunger 120. Extending from the arm 121 is an arcuate segment 125 serving the two-fold purpose of a counterweight for the arm 121 to pivot such arm to the position shown in Fig. 17, and also a means for pivoting the arm 121 against the plunger 120 to close the switch 119. This latter function is accomplished by engagement of the end 126 of the segment 125, with the actuating bar 81, when such bar is in its uppermost position, which position is slightly above the position where the fingers 88 engage the top edge of the slide 89, as shown in Fig. 18. When the actuating bar 81 is moved downwardly to bring the fingers 88 against the edge of such slide, the switch 119 will be opened and the lamp deenergized. By this arrangement the energization of the lamp 37 is under the control of the operator and is energized only when the pull plate 84 is in its extreme uppermost position, as hereinabove explained. By this arrangement the slide will not become overheated, and thereby deteriorated, by reason of heat from the lamp.

If desirable, a suitable adjustable foot 127 may be provided at the forward end of the apparatus so as to provide vertical adjustment for the enclosure to properly project the picture of the slide upon a suitable screen or the like.

A slide projector constructed in accordance with the foregoing description will provide a projector in which the slides may with ease and without danger of damage thereto, to be moved from one storage compartment to another through a projecting chamber.

As hereinbefore indicated, the cooling arrangement is such that cool air is first directed through the slide projecting compartment before it passes over and in contact with the lamp. By such arrangement, excessive heat is prevented from coming into contact with the slides, a feature which is most desirable in slide projectors.

A slide projector constructed in accordance with the foregoing description also prevents the slides from clinging to one another in their movement to viewing position, and provides for the movement of such slides conveniently and with ease and without damage, notwithstanding variations in thickness of the frames of the slides.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as my invention and desire to protect by Letters Patent is:

1. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, yieldable means for permitting but one slide at a time to enter said slide channel from said first-named storage compartment, said slide moving means comprising a pull plate having laterally extending spaced apart fingers for engagement with the top edge of an adjacent slide, and an operating bar for moving said pull plate.

2. A slide projector comprising an enclosure providing a storage compartment into which a stack of slides is adapted to be mounted on edge, a storage compartment into which said slides are successively received, projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, and yieldable means for tilting a slide moved from said slide channel into the slide receiving compartment against said inclined wall and from the path of movement of a slide through said slide channel.

3. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, yieldable means for permitting but one slide at a time to enter said slide channel from said first-named storage compartment, and yieldable means for tilting a slide moved from said slide channel into the slide receiving compartment, against said inclined wall and from the path of movement of a slide through said slide channel.

4. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, said slide moving means comprising a pull plate having laterally extending spaced apart fingers for engagement with the top edge of an adjacent slide, an operating bar for moving said pull plate, and yieldable means for tilting a slide moved from said channel into the slide receiving compartment against said inclined wall and from the path of movement of a slide through said slide channel.

5. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, spring means for holding the slide in said slide channel within said projecting chamber and against upward movement when said slide moving means is moved upwardly to a position to engage a succeeding slide.

6. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, yieldable means for permitting but one slide at a time to enter said slide channel from said first-named storage compartment, and spring means for holding a slide in said slide channel within said projecting chamber and against upward movement when said slide moving means is moved upwardly to a position to engage a succeeding slide.

7. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, said slide moving means comprising a pull plate having laterally extending spaced apart fingers for engagement with the top edge of an adjacent slide, an operating bar for moving said pull plate, and spring means for holding a slide in said slide channel within said projecting chamber and against upward movement when said pull plate is moved upwardly to a position to engage a succeeding slide.

8. A slide projector comprising an enclosure providing a storage compartment into which a stack of slides is adapted to be mounted on edge, a storage compartment into which slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, yieldable means for tilting a slide moved from said slide channel into the slide receiving compartment, against said inclined wall and from the path of movement of a slide through said slide channel, and spring means for holding a slide in said slide channel within said projector chamber and against upward movement when said slide moving means is moved upwardly to a position to engage a succeeding slide.

9. A slide projector comprising an enclosure providing a storage compartment into which a stack of slides is adapted to be mounted on edge, a storage compartment into which said slides are successively received, a projector chamber having projecting mechanism therein, a slide channel opening communication between said compartments and transversing said projector chamber, follower plates in said compartments with one of said plates having a slide engaging wall inclined with respect to the horizontal, means for moving said slides successively from the first-named storage compartment into said slide channel within said projector chamber, spring means for holding the slide in said slide channel during movement of said slide moving means in a position to engage for movement a succeeding slide in the aforesaid stack of slides, the slide in said slide channel being moved to the other of said compartments by the movement of said succeeding slide by said slide moving means, said slide moving means comprising a pull plate having laterally extending spaced apart fingers for engagement with the top edge of an adjacent slide, an operating bar for moving said pull plate, yieldable means for tilting a slide moved from said channel into the slide receiving compartment, against said inclined wall and from the path of movement of a slide through said slide channel, and spring means for holding a slide in said slide channel within said projector chamber and against upward movement when said pull plate is moved upwardly to a position to engage a succeeding slide.

References Cited in the file of this patent

UNITED STATES PATENTS

| Number | Name | Date |
|---|---|---|
| 1,002,078 | Paoli | Aug. 29, 1911 |
| 1,093,401 | Gotlieb | Apr. 14, 1914 |
| 1,966,531 | Tint | July 17, 1934 |
| 1,967,161 | Simon | July 17, 1934 |
| 2,029,871 | Johnson | Feb. 4, 1936 |
| 2,213,779 | Young | Sept. 3, 1940 |
| 2,286,322 | Warringer | June 16, 1942 |
| 2,298,322 | Wengel | Oct. 13, 1942 |
| 2,362,601 | Wengel | Nov. 14, 1944 |
| 2,401,506 | Pechkranz | June 4, 1946 |
| 2,533,441 | Esters | Dec. 12, 1950 |
| 2,564,057 | Fitzgerald | Aug. 14, 1951 |
| 2,583,442 | Parlini | Jan. 22, 1952 |